No. 707,147. Patented Aug. 19, 1902.
I. METZGER.
JOURNAL BEARING.
(Application filed Mar. 5, 1901.)
(No Model.)
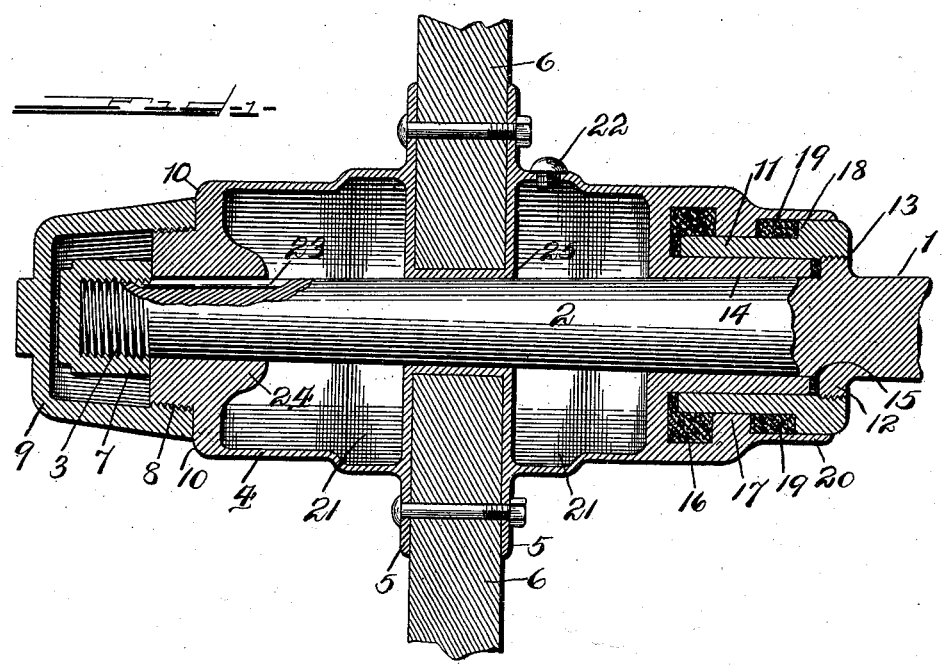
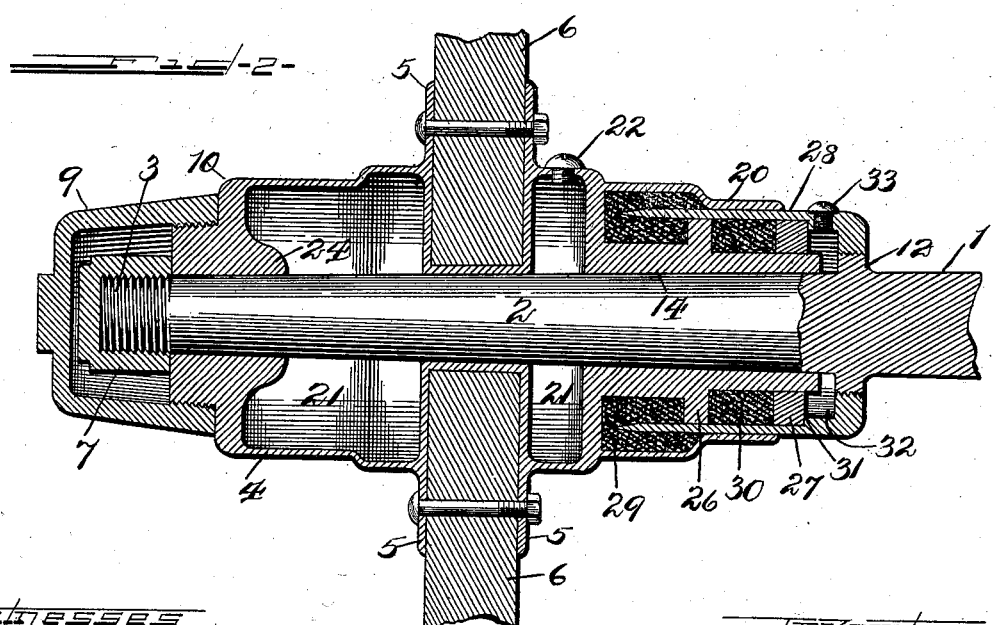

UNITED STATES PATENT OFFICE.

ISBON METZGER, OF WINFIELD, IOWA.

JOURNAL-BEARING.

SPECIFICATION forming part of Letters Patent No. 707,147, dated August 19, 1902.

Application filed March 5, 1901. Serial No. 49,983. (No model.)

*To all whom it may concern:*

Be it known that I, ISBON METZGER, a citizen of the United States, residing near Winfield, in the county of Louisa and State of Iowa, have invented certain new and useful Improvements in Journal-Bearings, of which the following is a full, clear, and exact specification.

My invention relates more particularly to journal-bearings for vehicle-wheels; and it has for its primary object to provide an improved and simple form of self-lubricating bearing for axle-spindles capable of receiving and storing a large supply of oil or lubricant and which shall be practically proof against the admission of grit or dirt and the escape of the lubricant.

With these ends in view my invention consists in certain features of novelty in the construction, combination, and arrangement of parts by which the said objects and certain other objects hereinafter appearing are attained, all as fully described with reference to the accompanying drawings and more particularly pointed out in the claims.

In the said drawings, Figure 1 is a vertical longitudinal sectional view of a vehicle wheel-hub and axle-spindle embodying my improvements. Fig. 2 is a similar view showing certain modifications hereinafter described.

1 is an axle; 2, a spindle formed on or secured thereto as usual or in any suitable way and preferably of tapering form and having screw-threads 3 at its outer end.

4 is a hub inserted over the spindle 2 and having sockets or seats 5 for spokes 6, which may be bolted or riveted therein in any suitable way. The outer end of the spindle 3 protrudes from the end of the main portion of the hub 4 and is provided on its threaded portion with a retaining-nut 7, which prevents the hub from pulling off outwardly. The end of the hub is provided with exterior screw-threads 8, upon which is screwed a cap 9, which abuts against a shoulder 10 on the hub and completely incloses the retaining-nut 7 and prevents the admission of dirt and the escape of oil or lubricant. The inner end of the spindle is provided with an annular flange or cup-shaped member 11, which is of larger diameter than the spindle and projects toward the outer end thereof. This flange or cup 11 may be formed on or secured to the spindle in any suitable manner. In the example of my invention shown in the drawings I provide the usual shoulder 12 at the inner end of the spindle with peripheral screw-threads 13, and upon which the cup 11 is screwed. The inner end of the hub is provided with a sleeve 14, which fits accurately around the spindle 2 at a point between the spindle and the cup or flange 11, and at the inner end of the sleeve 14 at a point between it and the shoulder 12 I locate a packing or gasket 15, which is compressed by these two parts and swelled outwardly against the flange 11 by such pressure, so as to exclude the admission of dirt to the interior of the hub and the escape of oil therefrom. The cup or flange 11 being considerably extended lengthwise of the exterior of the sleeve 14, it will be seen that the possibility of oil escaping from the hub or grit entering the hub will be reduced to the minimum. The hub is provided with an annular packing-chamber 16 at the inserted end of the flange or cup 11, which contains a quantity of packing and into which the inserted end of the cup is embedded, and the hub is provided with a shoulder 17, arranged at a slight distance from and opposed to a shoulder 18, formed on the exterior end of the cup 11, and between these two shoulders 17 18 is interposed a packing or gasket 19, so that when the hub and spindle are moved toward each other the packing 19 will be compressed laterally and expanded vertically against the hub and the cup 11, thereby preventing the admission of dirt to the hub between the shoulder 18 and the flange 20 on the inner end of the hub which encompasses said shoulder. This relative endwise movement will also compress the packing in the annular packing-chamber 16 and cause a similar vertical expansion of the packing against the hub and the cup 11.

The hub is preferably cast or formed with an enlarged oil or lubricant chamber 21, which is capable of receiving and storing a large supply of oil or lubricant, thus rendering the device self-lubricating for a great length of time. This lubricant may be inserted into the chamber 21 through a suitable plugged aperture 22 in the side of the hub or through an oil-groove 23 in the outer end of the spindle, the outer end of which oil-groove is accessible when the retaining-nut 7 is unscrewed partially, so that the point of an oil-can may be inserted in the groove and lubricant thus injected into the chamber 21.

The bearings for the spindle 2 are constituted by the enlargement 24 at the outer end of the hub and the sleeve 14 at the inner end, and also, if desired, by the contraction 25, in which the spokes are socketed, and the sleeve 14 is reinforced at about its mid-length by the shoulder 17, which bears against the cup 11, while the latter in turn has bearing against the sleeve 14.

In the form of my invention shown in Fig. 2 the devices at the inner end of the hub for preventing the escape of oil and the admission of dirt are somewhat modified. In this form the sleeve 14, which is formed on the hub like the sleeve 14 already described, is provided with a peripheral shoulder 26, and the shoulder 17 on the hub in the other form is omitted, and instead of such shoulder 17 I employ a loose ring 27, which has bearing against the periphery of the sleeve 14 and also against the inner side of a cup 28, which takes the place of the cup 11 and which encompasses the shoulder 26, said cup 28 being screwed or otherwise secured to the shoulder 12, as before described. Interiorly of the shoulder 26 I provide the hub with a packing-chamber 29, into which the inner end of the cup 28 is inserted, and at the exterior side of the shoulder 26, between said shoulder and the ring 27, I locate a packing 30, which is capable of being compressed and expanded outwardly against the cup 28 by relative movement of the shoulder 26 and ring 27. The ring 27 is shouldered against the cup 28 at 31, so as to prevent the ring from moving against the exterior end of the cup, and thus leaves an oil or lubricant chamber 32 between the ring 27 and exterior end of the cup surrounding the inserted end of the sleeve 14. The cup 28 may, if desired, be provided with a plugged filling-aperture 33, whereby the chamber 32 may be supplied with oil or lubricant.

In the use of my invention it will be understood that wherever packing or gaskets are employed hard grease may be substituted, if desired.

Having thus described my invention, what I claim as new therein, and desire to secure by Letters Patent, is—

1. The combination of a spindle, a hub journaled thereon and having a sleeve fitting around the spindle and projecting toward the inner end thereof, a cup-shaped flange secured to the spindle and projecting outwardly longitudinally thereof around said sleeve and into said hub, a loose bearing-ring interposed between said sleeve and cup-shaped flange and surrounding said sleeve and having abutment against a part fixed with relation to said flange, and packing interposed between said ring and a part movable with the hub, substantially as set forth.

2. The combination of a spindle, a hub journaled thereon and having a sleeve formed integrally therewith and a portion overhanging and surrounding said sleeve and constituting therewith an enlarged packing-chamber, a cup-shaped flange secured to the inner end of said spindle and projecting over said sleeve and into said packing-chamber, a supporting or bearing flange carried by the hub at about the mid-length of said cup-shaped flange and bearing thereagainst and a packing surrounding said cup-shaped flange at a point between said second flange and the end of said sleeve, substantially as set forth.

ISBON METZGER.

Witnesses:
F. A. HOPKINS,
EDNA B. JOHNSON.